(12) United States Patent
Sagov

(10) Patent No.: US 7,874,882 B2
(45) Date of Patent: Jan. 25, 2011

(54) DEVICE FOR MOVING AN OBJECT IN RELATION TO A FLUID

(75) Inventor: Magomet S. Sagov, Vestfossen (NO)

(73) Assignee: Clavis Holding AS, Hokksund (NO)

( * ) Notice: Subject to any disclaimer, the term of this patent is extended or adjusted under 35 U.S.C. 154(b) by 547 days.

(21) Appl. No.: 11/664,852

(22) PCT Filed: Oct. 5, 2004

(86) PCT No.: PCT/NO2004/000296

§ 371 (c)(1),
(2), (4) Date: May 23, 2008

(87) PCT Pub. No.: WO2006/038808

PCT Pub. Date: Apr. 13, 2006

(65) Prior Publication Data

US 2009/0023349 A1 Jan. 22, 2009

(51) Int. Cl.
*B63H 11/117* (2006.01)
(52) U.S. Cl. ....................................................... 440/14
(58) Field of Classification Search ............. 440/13–20; 60/221
See application file for complete search history.

(56) References Cited

U.S. PATENT DOCUMENTS 2,728,298 A * 12/1955 Shafer .......................... 417/343
3,765,175 A 10/1973 Ohnaka
4,490,119 A 12/1984 Young
5,370,561 A 12/1994 Jakobsen
6,500,033 B1 * 12/2002 Sagov .......................... 440/13

FOREIGN PATENT DOCUMENTS

| EP | 0 252 733 B1 | 1/1988 |
|---|---|---|
| JP | 52-103196 A | 8/1977 |
| JP | 55-152695 | 11/1980 |
| JP | 61-147695 U | 9/1986 |
| JP | 4-54794 U | 5/1992 |
| JP | 6-211187 | 8/1994 |
| WO | WO 97/48599 | 12/1997 |

OTHER PUBLICATIONS

Japanese Office Action for corresponding Japanese Patent Application No. 2007-535625, mailed Jun. 2, 2010, with English translation.

\* cited by examiner

*Primary Examiner*—Ed Swinehart
(74) *Attorney, Agent, or Firm*—Merchant & Gould P.C.

(57) ABSTRACT

The device comprises at least one flap member (3) having a rear flap portion that runs in a plate plane, and a forward portion, as seen in the direction of motion (F). The forward portion (8) is connected to the object (2) in such manner that the flap portion (17) can be moved in the fluid transverse to the plate plane and between two positions which are on their respective sides of a neutral place (P). Furthermore, the device comprises an actuating means (8, 9) which allows a freely oscillating motion of the flap member (3; 61, 62), and a drive unit (6) for actuating the flap member (3; 61, 62) when the valve of an oscillation amplitude of the flap member (3; 61, 62) is less than a predetermined threshold value.

28 Claims, 9 Drawing Sheets

DEVICE FOR MOVING AN OBJECT IN RELATION TO A FLUID

The invention relates to a device for moving an object in a direction of motion relative to a fluid.

A piston engine comprises components which for each stroke have to be accelerated, decelerated and re-accelerated. These accelerations and decelerations form a sequence which is not advantageous per se, but must be accepted as they are an integral part of the mode of operation of this engine. In, e.g., rotating engines (Wankel engines) these sequences are avoided.

NO 310401 discloses a propulsion device for ships where the components of a drive unit or engine are arranged to oscillate at a resonant frequency. Also in this oscillating drive unit, mass is accelerated and decelerated, but this mass represents alternately an accumulator and a source of energy, which is a prerequisite for the actual oscillation and does not cause any energy loss. This drive unit is thus well suited to an operation of drive elements which are driven back and forth, and which can easily be connected to the oscillating drive unit.

From NO 310401 it is also known that the drive unit is arranged to move a plate-like member, which can be moved in the ship's direction of motion, and whose plate plane runs transverse to the ship's direction of travel. This member provides an intermittent movement of water behind the ship.

To obtain a sufficiently large propulsion force, there is therefore a need for the object to have a large extent in the transverse direction of the ship, which may be a disadvantage if it is desirable that the ship's cross-section under water should be small.

Furthermore, it is already known, e.g., that swimmers can use flap-like elements, so-called flippers, which are fastened to each foot. By moving the flipper transverse to the swimming direction and optionally at the same time oscillating the flipper about the ankle joint, the swimmer can obtain a substantial speed using relatively little energy. However, at the end of each movement of the foot in one direction, the swimmer must use energy to brake this movement and to accelerate the foot in the opposite direction, and this requires a great deal of energy.

From U.S. Pat. No. 5,370,561 it is known that the stern of a boat can support two tiltable arms that extend backwards from the boat and into the water. A flap is pivotally connected to the rear ends of the arms and when the arms are tilted alternately in one direction and the other, a forward water force is exerted against the flap for forward movement of the boat. In this arrangement, the arms are operated continuously by an engine, and by means of a control system comprising a toothed belt that is connected to the flap, a sensor that determines the position of the flap, a control circuit and a torque motor, an attempt is made to tilt the flap towards a neutral position and against a torque which is produced by the water force. If the continuously operated engine is a piston engine, it will have a relatively large fuel consumption. The control system must constantly be in operation and this will further increase the fuel consumption. Moreover, the control system is complex, bulky and maintenance-intensive, and, hence, expensive.

U.S. Pat. No. 1,245,540 describes a pump with a housing in which a tiltable flap is located which is arranged to alternately draw fluid into the pump housing and to force fluid out of the housing. A drive unit for the flap is not discussed in any detail.

With a device having a combination of the known per se oscillating drive unit for operation of the known per se plate-like member for moving a fluid, where the member is arranged to be moved substantially transverse to the direction of a flow of a fluid in relation to the object, the result is a very simple and inexpensive device which in operation uses little energy. In this case, the object may be, e.g., a vessel such as a ship, and the member may be arranged in the water behind the ship in order to move it forwards. The object may instead be, e.g., a pipe for the transport of a fluid, and the member may be located in the fluid for pumping the fluid in relation to the pipe.

The object of the invention is to provide a device of the aforementioned type which does not have the aforementioned disadvantages.

The characteristic aspects of the device according to the invention are apparent from the characteristic features disclosed in the claims.

In the following, the invention will be described in more detail with reference to the drawings, which schematically show embodiments of the invention, the member for the sake of simplicity being called hereafter "flap".

Figure 14:
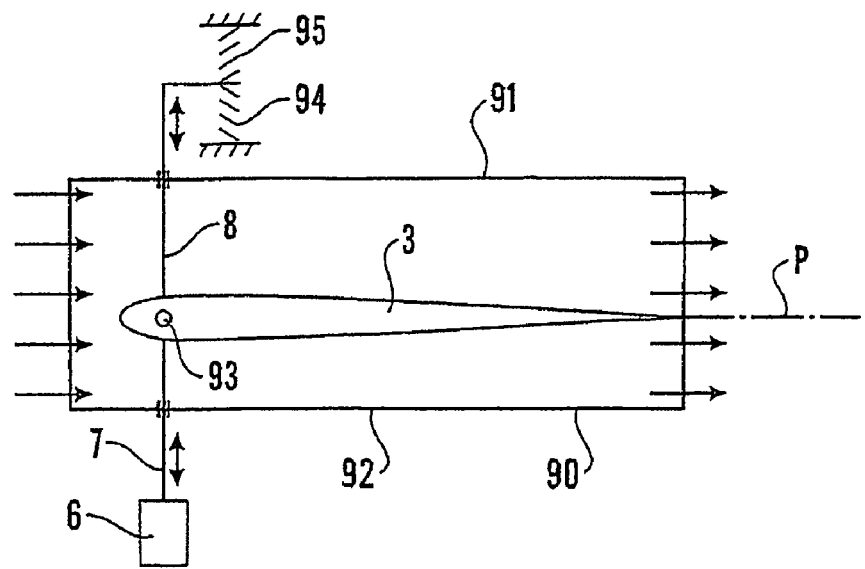
Figure 15:
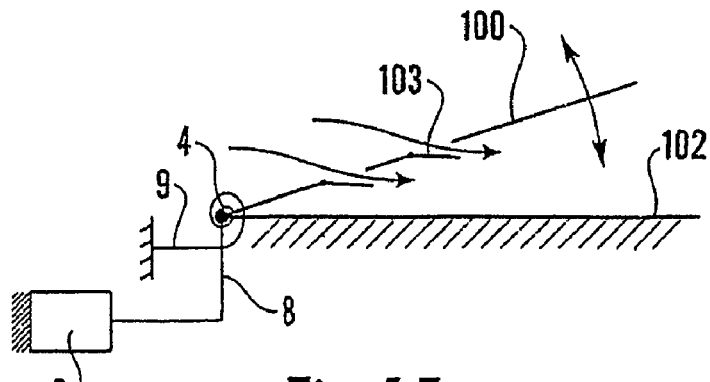

FIG. 14 is a side view of another embodiment of a device according to the invention, comprising a flap whose forward end portion is flexibly connected to a rod that is connected to a drive unit FIG. 15 is a side view of another embodiment according to the invention, comprising a flap that is tiltably connected to a part of the exterior of the hull, and which can be tilted towards or away from this part, and which is provided with check valves.

Figure 16:
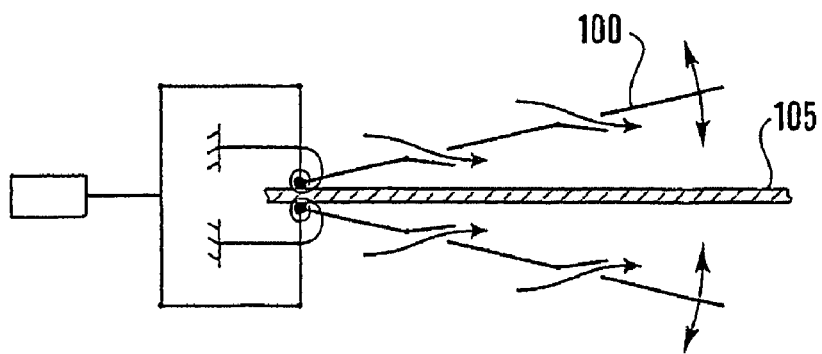

FIG. 16 is a side view of another embodiment of a device according to the invention, comprising tiltable flaps of the type shown in FIG. 15, and which are arranged on their respective sides of a plane portion of the hull.

Figure 17:
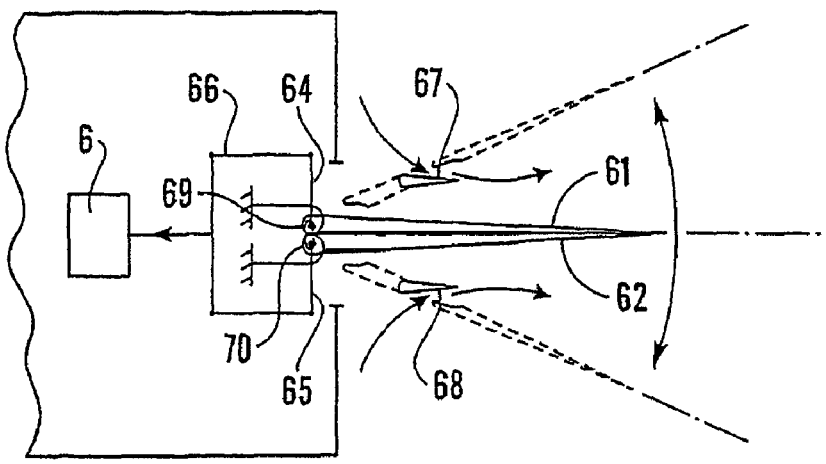

FIG. 17 is a side view of another embodiment of a device according to the invention, comprising two flaps that are moved in opposite phase, the flaps being provided with check valves.

Figure 6:
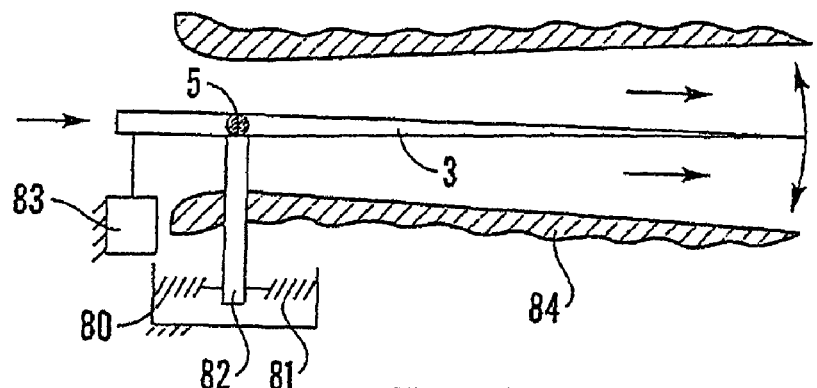
FIG. 6 is a side view of another embodiment of the device according to the invention, comprising an inflexible flap resembling the flap shown in FIG. 1, but arranged to be moved between two walls.
Figure 18:
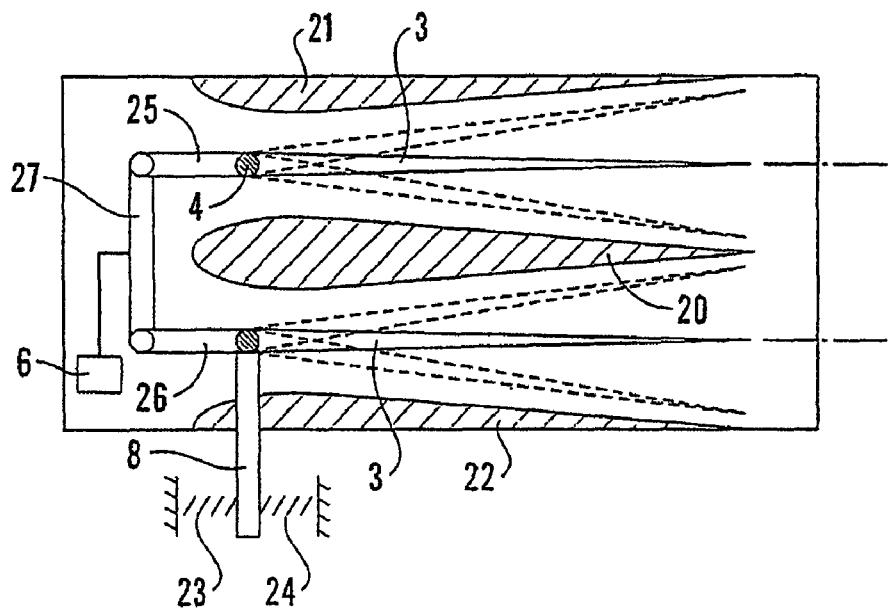

FIG. 18 is a side view of a device with two flaps of the type shown in FIG. 6.

Figure 7:
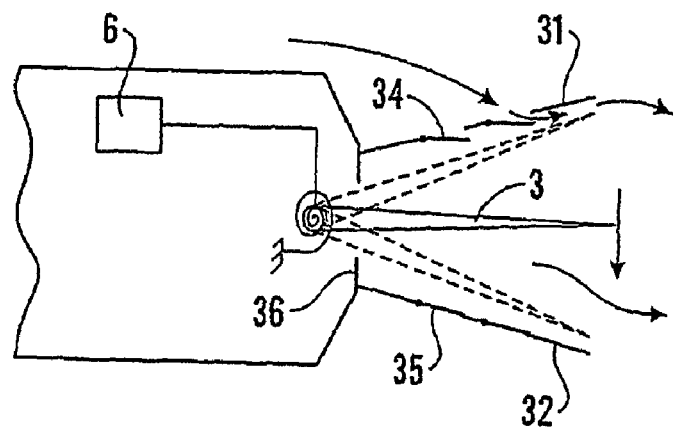
FIG. 7 is a side view of another embodiment of the device according to the invention, with a flap resembling the flap shown in FIG. 1, but where at each side of the flap there is arranged a wall that is stationary relative to the hull, and which is provided with check valves.
Figure 19:
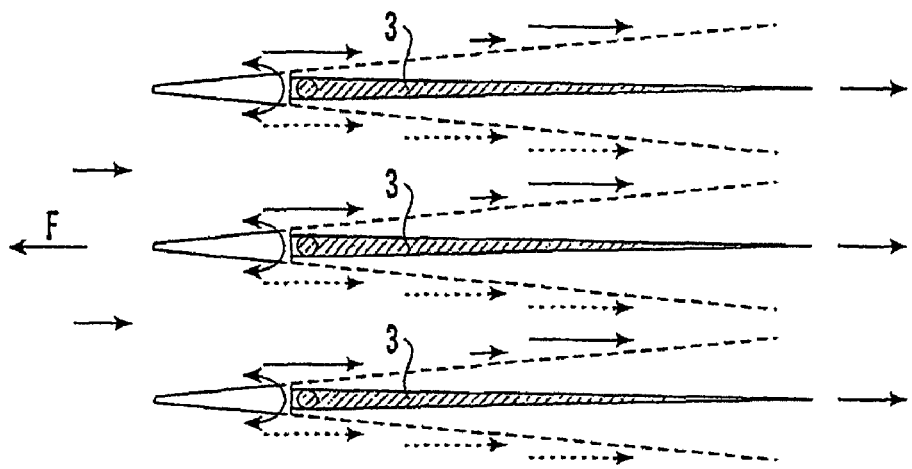

FIG. 19 is a side view of another embodiment of a device according to the invention, comprising three flaps of the type shown in FIG. 7.

Figure 20:
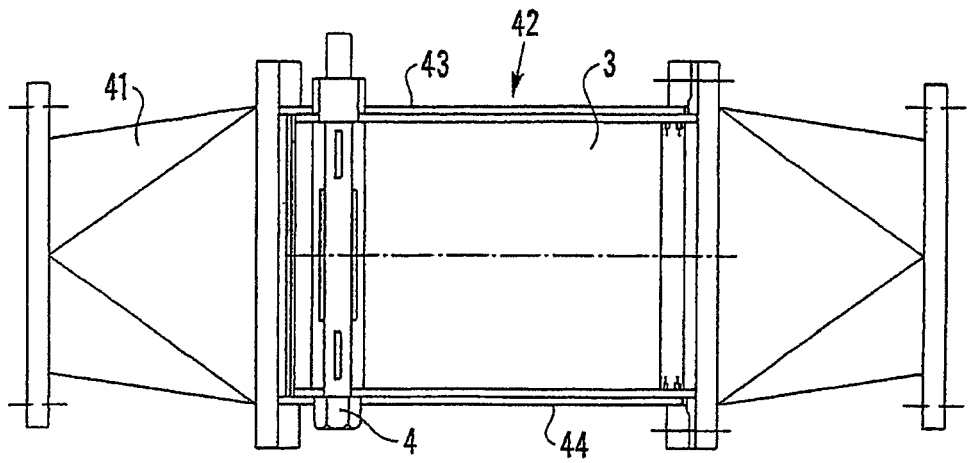

FIG. 20 is a top view of a pipeline or conduit with a device according to the invention, wherein a flap and a pair of walls with check valves as shown FIG. 7 are arranged in the pipeline, and a top cover of the pipeline has been removed.

Figure 21:
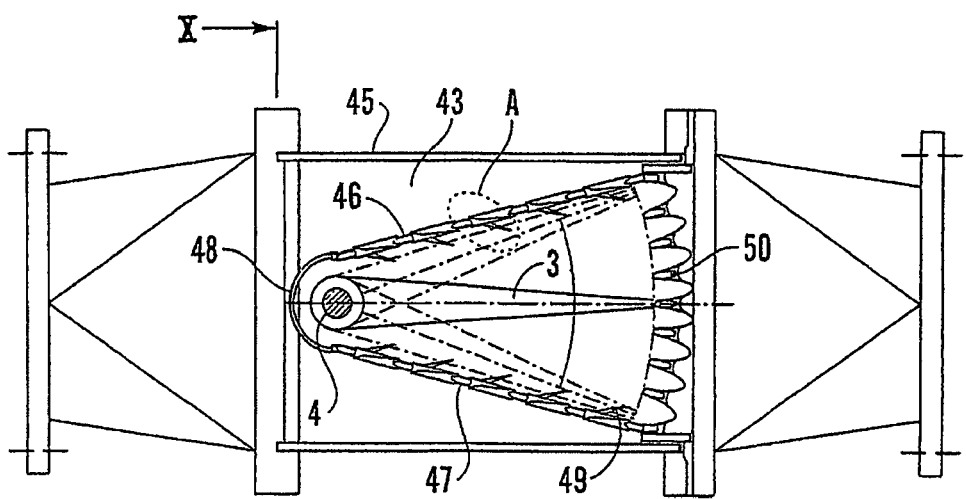

FIG. 21 is a side view of the pipeline shown in FIG. 20, wherein a side cover of the pipeline has been removed.

Figure 22:
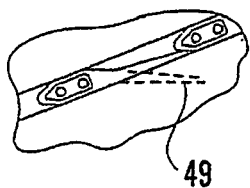

FIG. 22 shows a section of an area of FIG. 21 as indicated by the letter A.

Figure 23:
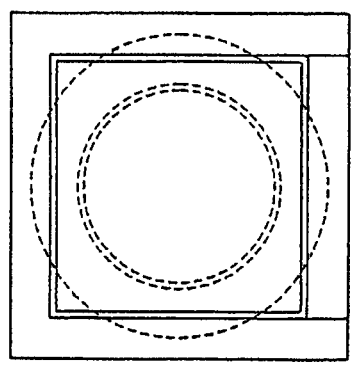

FIG. 23 shows a section taken along the line X-X through the pipeline shown in FIG. 21.

Figure 24:
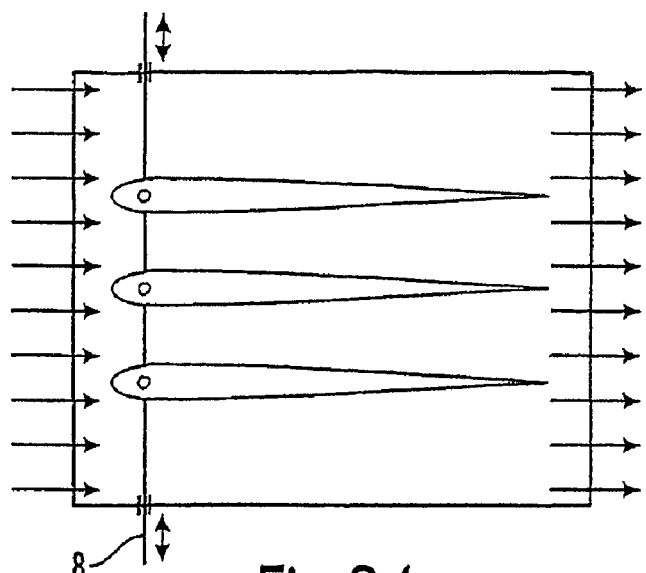

FIG. 24 is a side view of a device with three flaps of the type shown in FIG. 14.

Figure 8:
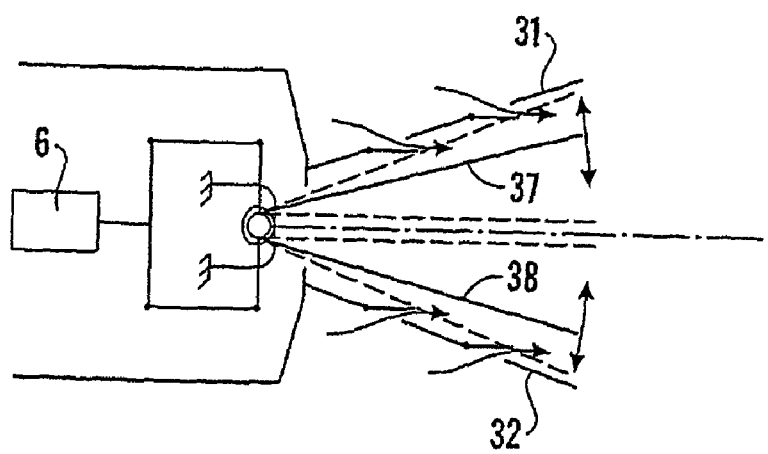
FIG. 8 is a side view of another embodiment of a device according to the invention, comprising two flaps that are tiltable about the same axis, and which can be moved in opposite phase between two walls that are provided with valves.
Figure 25:
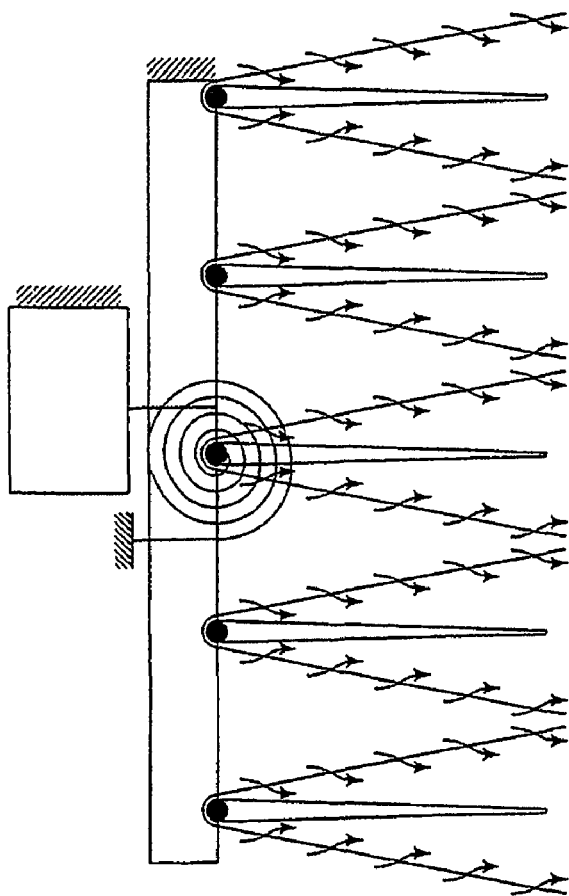

FIG. 25 is a side view of a device with five flaps of the type shown in FIG. 8 or 16, where the drive unit is shown further schematised.

Figure 26:
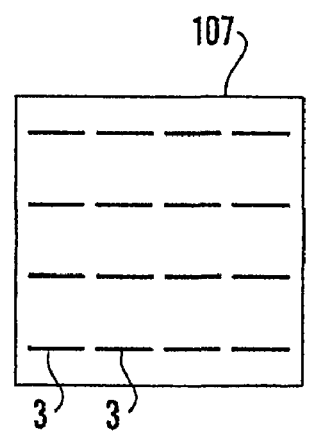

FIG. 26 is a view of an assembly comprising a row of devices according to the invention.

Figure 27:
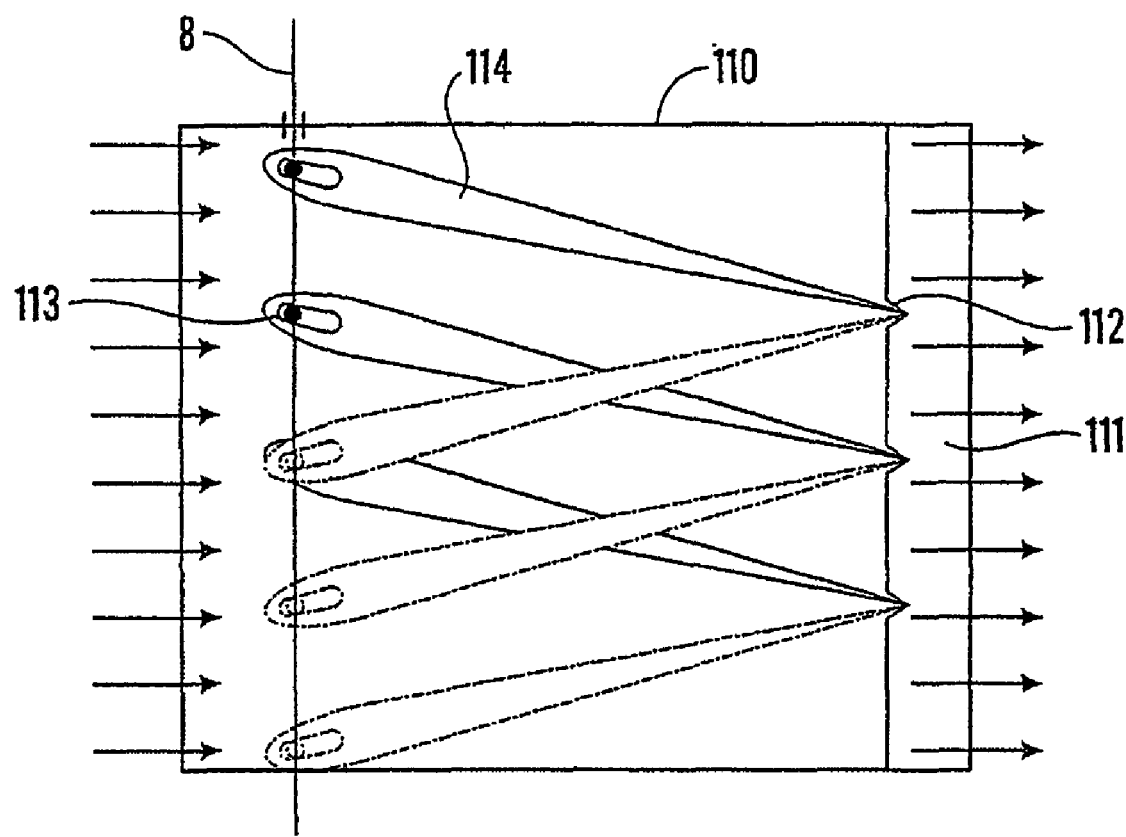

FIG. 27 is a side view of a further embodiment of a device according to the invention, comprising three flaps.

The terms "to the right" and "up" in the following should be understood to mean respectively the direction towards the right end of the drawing sheet and the end of the drawing sheet facing away from the reader.

Corresponding components are indicated by the same reference numerals in the figures.

Figure 1:
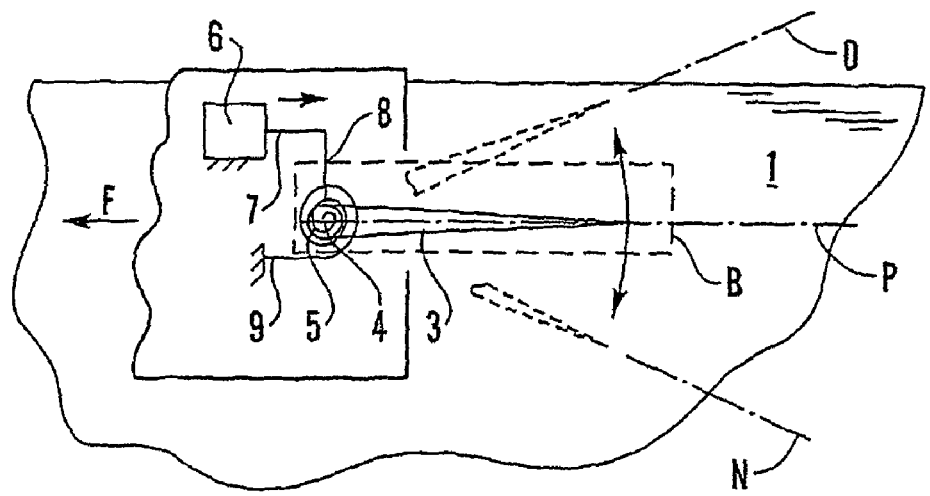
FIG. 1 is a side view of a first embodiment of a device according to the invention, wherein an inflexible member, hereafter called "flap", at its forward end is pivotally supported in a hull of a vessel such as a ship.
Figure 1A:
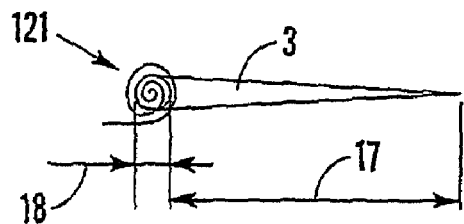
FIG. 1a is an illustration showing the section that is indicated by the letter B in FIG. 1.

As shown in FIG. 1, located in water 1 is a hull 2 of a vessel such as a ship that is moving towards the left at a speed F relative to the water. A substantially streamlined and plate-like flap or flap member 3 has a plate plane which in the figure runs horizontally and in the longitudinal direction of the vessel. As can be seen from FIG. 1a, the flap 3 has a flap portion 17 and a forward portion 18. The forward portion of the flap has a pivot axle 4 whereby it is supported in the hull so that the flap 3 can tilt about a horizontal axis of rotation 5. The pivot axle 4 and its support in the hull thus form a hinge and a first connecting means 121.

A drive unit 6 has a driving rod 7 which can be moved back and forth in its longitudinal direction, and which can actuate an arm 8 which in turn is connected to the pivot axle 4. When the drive unit 6 via the driving rod 7 exerts a force to the right against the arm 8, the flap is tilted or swung clockwise.

One of the ends of a spring 9, such as a helical torsion spring, is fastened to the hull 2 and the other end of the torsion spring is fastened to the pivot axle 4. The torsion spring 9 tries to hold the flap 3 in such manner that the plate plane of the flap runs in a neutral plane P, e.g., a horizontal plane, when it is not loaded. The components that are moved together with the flap 3 have corresponding, respective neutral positions. The spring 9 is thus gradually put under more tension in opposite directions when the flap is moved away from its neutral position in respectively a clockwise and anticlockwise direction, and the spring 9 tries constantly to bring the flap 3 back to the neutral position.

In the illustrated embodiment the flap 3, the pivot axle 4, the arm 8 and optionally an additional component form a unified mass. Together, the torsion spring 9 and this mass form a spring/mass arrangement or an actuating means which can oscillate at a resonant frequency that is determined by fixed values for the stiffness of the spring, the mass of the said components and the damping of the oscillating motion.

The figures are schematic and do not include components which simply serve to increase the complexity of the figures. Thus, for instance sealing means that prevent inflow of water into the hull through openings between the components of the device and the hull etc. have not been included in the drawing as an arrangement of such means will be obvious to the skilled person.

The mode of operation of the device will be described below, based on the assumption that the components of the device are in the position indicated in solid lines in FIG. 1.

Initially, the drive unit 6 exerts a transitory, almost shock-like driving force towards the right against the arm 8 via the driving rod 7, whereby the arm 8 and the flap 3 are moved clockwise. These components thus receive a certain amount of energy of which a first portion is transferred to the water surrounding the flap. This energy portion is converted into kinetic energy in that the water is set in motion essentially in the direction at right angles to the neutral plane P. The other, remaining energy portion is, during the movement of the flap towards the position N in FIG. 1, converted into potential energy in the spring 9. When the flap has reached the position N, all the energy that has been supplied by the drive unit has been converted into kinetic energy for the water and potential energy in the spring 9, whereby the speed of the flap is zero. The force exerted by the spring 9 against the flap 3 is now a maximum force.

When the flap thus has reached the position N, the spring 9 causes a movement of the flap 3 in the opposite direction, i.e., back towards the neutral plane P and in an anticlockwise direction, during which the potential energy of the spring is converted to kinetic energy for the water, the flap 3 and the components that are moved together therewith. At this time, the flap 3 runs at an angle relative to the direction of motion F. When the flap 3 has reached the neutral plane P, all potential energy of the spring 9 has been converted into kinetic energy for the flap 3 and the water, so that the speed of motion of the water has a backward component. Consequently, a reaction force is exerted against the flap and thus the hull in the direction of motion F. Conversion of a portion of the kinetic energy into potential energy in the spring 9 then takes place again, whereupon the flap 3 is stopped in the position indicated by the letter O in FIG. 1. The flap is then accelerated in the clockwise direction and the aforementioned movement pattern is repeated, the flap and the components that have been set in motion therewith and the spring forming a freely oscillating or swinging structure. For each swing of the flap 3 between the extreme positions N and O of the flap, water is pushed backwards, i.e., to the right, whilst against the hull, a reaction force is exerted towards the left, i.e., forwards in the direction F. It will be understood that it is the flap portion 17 of the flap that provides the motion of the water. The forward portion contributes very little to this motion.

The device according to the invention also comprises an arrangement (not shown) whereby the oscillation amplitude can be monitored. This arrangement may, e.g., comprise sensors that determine the angular position and movement of the flap, and a computer that is connected to the sensors. When the oscillation amplitude has been reduced so that it falls below a predetermined threshold value, and it has been determined that the arm 8 has started a movement away from the drive unit 6, a control signal is sent from the computer to the drive unit 6 for the exertion of a possibly transitory force against the arm 8 as described above, so that the oscillating structure is supplied with such a large amount of energy that compensation for the amplitude reduction or decrement will be obtained. The drive unit 6 may therefore be small, and it will be used only when there is a need for a fresh supply of energy to the oscillating structure.

The drive unit may comprise, e.g., a combustion chamber into which at a desired time there may be introduced a combustible material such as combustible gas material or a material in solid form that is combusted rapidly and actuates a piston or a diaphragm that is connected to the driving rod 7.

Figure 2:
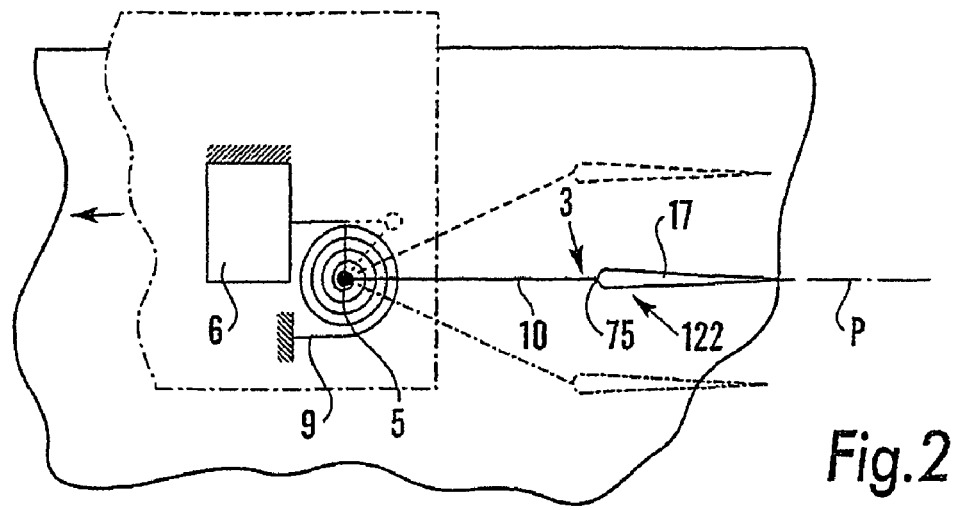
FIG. 2 is a side view of a second embodiment of a device according to the invention, comprising a flap whose forward end portion is flexibly connected to a supporting rod which in turn is pivotally supported in the hull at its forward end.

FIG. 2 shows a device resembling that shown in FIG. 1, but where an inflexible flap member or flap 3 comprises a inflexible, almost plate-like flap portion 17 and the forward portion of the flap member is made of a rigid rod or supporting rod 10. Here, it has been taken into account that it is the flap portion which provides the motion of the water, whilst the forward portion only contributes slightly to this motion. The distance between the tilting axis 5 and the flap portion 17 has therefore been increased. When the flap 3 is in a neutral position, the plate plane of the flap portion runs in a neutral plane P.

The forward end of the supporting rod is connected to the hull so that it can tilt about a tilting axis 5.

The rear end of the supporting rod is via suitable means (not shown) flexibly connected to a forward portion of the flap portion 17 at a point of connection 75. This connection forms a second connecting means 122 which may also be a hinge device.

These means seek in a elastically resilient manner to bring the supporting rod 10 and the flap portion 17 into a mutually aligned position in which the supporting rod 10 runs in the plate plane. At the forward end of the supporting rod there may e.g., be arranged a torsion spring 9 which tries to hold the supporting rod 10 in a neutral position as shown in FIG. 2 in a solid line.

Figure 3:
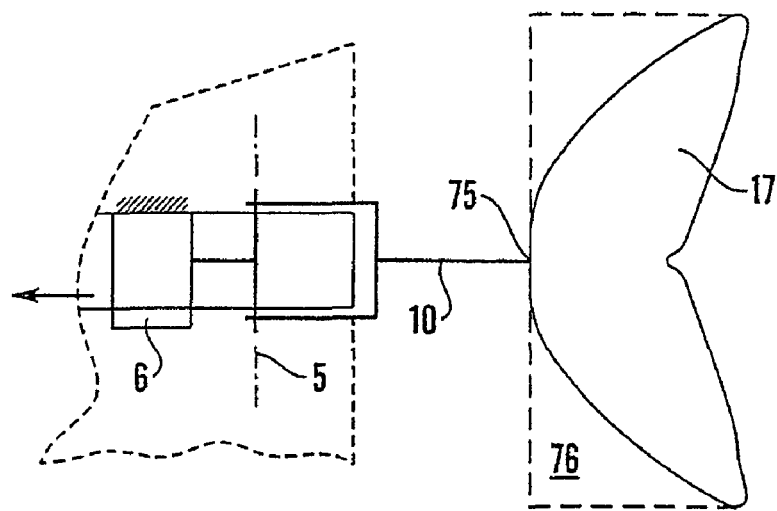
FIG. 3 is a top view of the device in FIG. 2.

As can be seen from FIG. 3, the flap portion 17 in top view is essentially triangular, in that it may have the shape of a fish tail where a portion 76 at the forward, outer area of the flap portion that is ineffective as regards propulsion, and which would have given the flap portion an almost rectangular form, has been omitted. The flap portion 17 may however have another shape. For example, it may advantageously be elliptical.

Figure 4:
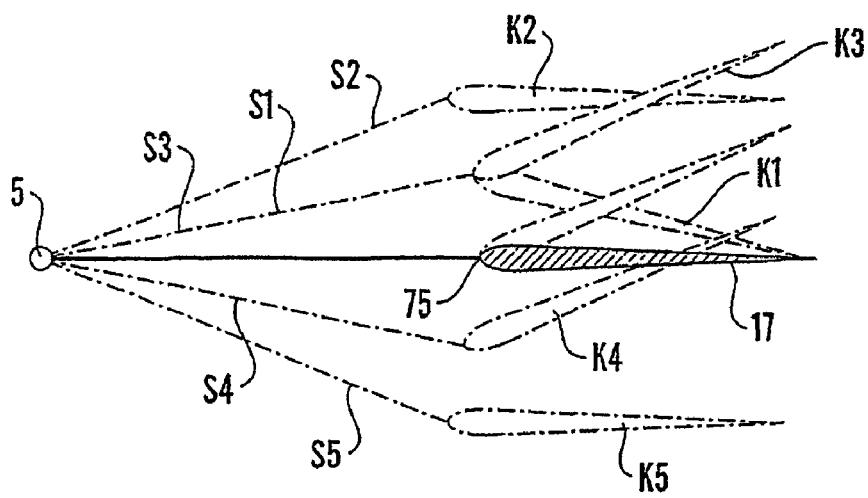
FIG. 4 is an enlarged side view of the flap according to FIG. 2, where a centre position of the supporting rod and the flap is indicated in a solid line, and other positions thereof are indicated in broken lines.

In FIG. 4 different positions of the supporting rod 10 and the flap portion 17 relative to each other are shown in broken lines, where the supporting rod 10 has also been tilted away from its neutral position.

Thus, the supporting rod 10 and the flap portion 17 are shown in a first position S1 and K1, respectively, wherein the supporting rod has been moved a small distance anticlockwise away from its neutral position. Because of the flexible point of connection 75 and because of the inertia and water drag of the flap portion, the flap portion 17 has however been swung a small distance in the clockwise direction to a position K1 relative to the supporting rod 10.

When the supporting rod has been tilted into its upper extreme position S2, the flap portion 17 then runs almost horizontally in the position K2.

However, on an immediately subsequent movement of the supporting rod 10 towards the neutral position and in the clockwise direction to the position S3 (which for the sake of simplicity corresponds to the position S1 of the supporting rod), the flap portion 17 is, for the same reasons as mentioned above, tilted a small distance in the anticlockwise direction to a position K3 relative to the supporting rod. On further movement of the supporting rod 10 in the clockwise direction past the neutral position, it reaches an intermediate position S4 and then a lower extreme position S5, the position of the flap portion 17 and the supporting rod 10 relative to each other changing only slightly.

Subsequently, the supporting rod can be moved from the lower extreme position towards the neutral position, thereby obtaining a movement pattern of the supporting rod and the flap portion 17 corresponding to the aforementioned movement pattern from the upper extreme position towards the neutral position.

Instead of the supporting rod 10 and the flap portion 17 being inflexible, one of them or both of them may be elastically flexible. Although it is advantageous that resilient means are arranged at the point 75, the connection between the supporting rod and the flap may however be inflexible. Such means may be a torsion spring one end of which is connected to the supporting rod 10 and the other end of which is connected to the flap portion 17. Alternatively, the connection may be formed by a material that is elastically flexible and which is connected to the supporting rod 10 and the flap portion 17.

Figure 5:
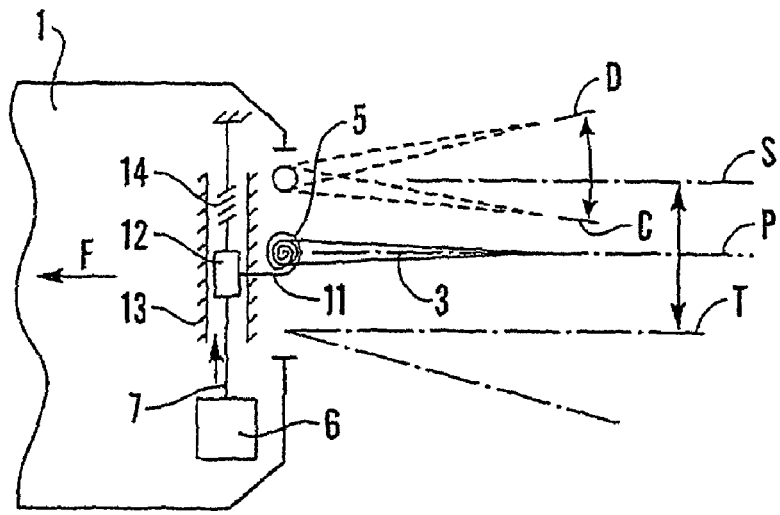
FIG. 5 is a side view of another embodiment of the device according to the invention, where an inflexible flap is supported in the hull so that the flap can be tilted and at the same time be displaced in its transverse direction.

FIG. 5 shows another embodiment of the invention, where the hull 1 supports a flap member or flap 3 that resembles the flap shown in FIG. 1. However, the flap 3 is via a first spring 11 connected to a slide block 12 which is run in a rail 13 that is secured to the hull and runs transverse to the direction of motion F and the plate plane of the flap. The flap 3 is thus arranged for translational movement transverse to the neutral plane P.

The first spring 11 tries to hold the flap 3 in such manner that the plate plane of the flap runs in the direction of motion F, i.e., in a neutral position relative to the slide block 12, but it allows the flap 3 to be resiliently angularly displaced an angular distance in opposite directions about an axis of oscillation 5 which is close to the forward end of the flap.

The upper end portion of the slide block 12 may be connected to one end of a combined pressure and tension spring or other spring 14. The other end of the spring 14 is connected to the hull 1.

The second end portion of the slide block 12 may be actuated by a compressive force that is exerted by a drive unit 6 via a rod 7. When the drive unit 6 does not exert any pressure on the slide block and the flap 3 is stationary, the springs 11, 14 cause the flap 3 to be in the position shown in a solid line in FIG. 5, i.e., a position in which the flap runs in a neutral plane P and is in its neutral position relative to the rail 13.

If the flap 3 is stationary and is in the position shown in the solid line in FIG. 5, and an upward force is exerted by the drive unit 6 on the slide block 12, the slide block 12 will initially be accelerated upwards whilst the flap 3, because of its inertia and water drag, is swung in a clockwise direction a small angular distance depending on the spring characteristics of the first spring 11, the second spring 14 at this time being compressed. When the energy that has been supplied by the drive unit 6 to the movable structure comprising the slide block, the spring 11 and the flap 3, has been converted into kinetic energy of the water surrounding the flap 3 and potential energy in the first and the second spring 11, 14, the slide block 12 has an upper position (not shown) where the flap is in the position indicated by the reference letter C in FIG. 5.

The first spring 11 then causes a turning of the flap 3 into a position D whilst the second spring 14 causes a downward acceleration of the slide block 12.

When the slide block 12 and the flap 13 pass the neutral plane P, all potential energy in the springs 11, 14 has been converted into kinetic energy, whereupon the springs 11, 14 are re-tensioned in a manner similar to that described above. Thus, a repeated oscillation of the flap with gradually decreasing amplitude is also obtained. When the amplitude falls below a predetermined threshold value, the drive unit is reactivated so that it exerts an impact force against the slide block and compensation for the reduction in amplitude is obtained.

Thus, it will be understood that the flap 3 during each stroke of the tilting motion runs obliquely relative to the neutral plane, e.g., so that there is obtained an effective backward movement of the water with the aid of the flap, and a correspondingly large reaction force against the hull, and that the flap is then moved into a position corresponding to the position D at the upper part of the tilt stroke. Furthermore, it will be understood that the flap 3 according to FIG. 5 is moved a large distance transverse to the neutral plane, which is also the case with the flap shown in FIG. 2. Thus, an efficient device is obtained.

Instead of the device comprising a first spring 1, the flap 3 may be made of an elastic material and be fastened directly to the slide block 12. Thus, the flap 3 during its oscillation may be bent transverse to its plate plane into positions like the positions C and D, whilst potential energy also in this case is stored in or released from the flap. Since the flap 3 is tapered backwards, when viewed from the side, it is possible to ensure it has decreasing rigidity in this direction. Alternatively, the device may both comprise the spring 11 and in addition be made of an elastic material.

FIG. 6 shows a flap of the type shown in FIG. 1, where the flap may be actuated by a drive unit 83, and the torsion spring 11 has been replaced by a similarly functioning device comprising two coil springs 80, 81 which actuate an arm 82 that is fixedly connected to the flap 3. The flap 3 is arranged between two walls, e.g., of a conduit or pipeline 84 having a square cross-section and can thus function as a pump. The function of this device corresponds to the function of the device in FIG. 1, but in this case cooperation is obtained between the flaps 3 and the walls of the conduit 84 so that the effect is better.

FIG. 7 is a view of a device according to the invention that resembles the device shown in FIG. 1. However, in connection with this device there is arranged above and below the flap 3 a stationary plate or wall 31 and 32, respectively. The distance between the walls 31, 32 increases in the direction from the forward end of the walls to the rear end of the walls. Each of the walls 31, 32 is provided with two check valves 34, 35. It will be understood that more or fewer than two valves could be provided. These check valves 34, 35 are arranged to allow a flow from the outside of the walls, i.e., from the space which is on the side of the walls facing away from the flap 3, to the space between the walls, as is shown by arrows. At or in front of the forward end of the flap 3 there may be provided a transverse wall 36 which prevents water from flowing forwards from the space between the walls 31, 32. If the whole flap 3 is located in the water behind the ship, the forward wall may, for example, comprise at least one check valve that allows water to flow into the space between the walls 31, 32.

During oscillation of the flap 3, water is drawn in through the valves 34, 35 of the plate 31, 32 which the flap is momentarily moved away from, whilst the valves of the opposite plate remain closed. As shown in FIG. 7, where the flap 3 is momentarily moved, for example, in the clockwise direction, water that is between the flap 3 and the plate 32 towards which the flap 3 momentarily moves, is forced backwards, whereby the valves 35 remain closed, whilst the valves 34 of the upper plate 31 are opened so that water, via the valves 34, flows from above into the space between the flap 3 and the plate 31 which the flap 3 moves away from. It is thus ensured that the device has a high rate of efficiency during oscillation of the flap.

FIG. 8 shows another embodiment of a device according to the invention, comprising two flaps 37, 38 which can be moved in opposite phase between two walls that are provided with check valves. When the flaps 37, 38 are moved towards each other, the water between the flaps is forced backwards. When the flaps are moved away from each other, water flows through the valves of both walls.

Figure 9:
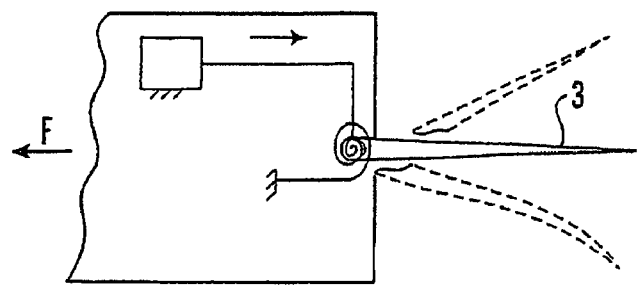
FIG. 9 is a side view of another embodiment of a device according to the invention, comprising a flap which at its forward end is pivotally supported in, e.g., a hull of a vessel, the flap being made of a resilient, flexible material with decreasing rigidity from the forward end of the flap to its rear end.

FIG. 9 is a view of a device according to the invention that resembles the device shown in FIG. 1, but where the flap 3 is made of an elastic material so that it is bendable in its transverse direction.

FIGS. 10-13 show a device with a flap resembling that shown in FIG. 6, but where the flap 3 is made of a elastomeric material, and where above and below the flap and symmetrically about the neutral plane P there is arranged a plate or wall 51, 52, the walls being arranged symmetrically about the neutral plane P and the distance between the walls increasing in the direction towards the right. Check valves 53 are provided in the walls as described in connection with FIG. 7. Via the check valves, water can flow into the spaces between the flap 3 and the respective walls 51, 52 during oscillation of the flap. In front of the forward part of the flap 3 the walls 51, 52 are connected to each other via a transverse wall 54, through which an arm 8 is sealingly passed. The arm 8 can be actuated by a drive unit 6 as mentioned above.

Figure 10:
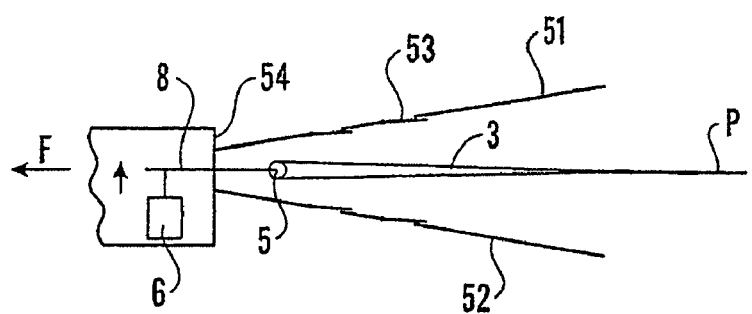
FIGS. 10-13 are side views of another embodiment of a device according to the invention, comprising a flap like the flap shown in FIG. 9, but where on each side of the flap there is arranged a side wall provided with check valves like that shown in FIG. 7, the figures showing respective, different stages of the flap during a tilting of the flap.

In FIG. 10 the flap is stationary and runs in the neutral plane P. To start the device when the flap is in this position, the drive unit 6 is activated and it then briefly exerts a force against the arm 8, so that the flap 3 is initially tilted about the tilting axis 5 in an anticlockwise direction into the position shown in FIG. 11. In this way successive portions of the flap portion, as seen from the front backwards, come consecutively to rest against the upper wall 51, and water is thus drawn in between the flap and the lower wall 52 via the check valves in this wall. At the same time, water between the upper wall 51 and the rear portion of the flap 3 is forced essentially backwards. To prevent water at the same time being forced sideways, the device may advantageously comprise vertical plates or walls (not shown) which are arranged between the upper wall 51 and the lower wall 52 and close to the lateral edges of the flap. If the flap 3 can bear sealingly against these vertical walls, the space between the plates 51 and 52 can be sealed off sideways. In the position of the flap 3 as shown in FIG. 11, the space between the flap 3 and the upper wall 51 is thus only open backwards.

Figure 12:
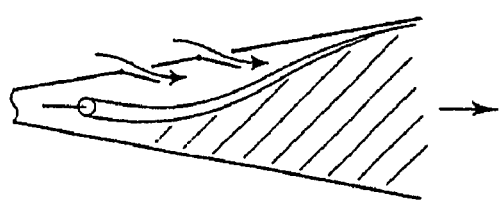

The oscillating unit subsequently causes a swinging of the flap 3 downwards so that a flap form as shown in FIG. 12 is obtained. At this time, water between the flap 3 and the lower wall 52 is forced backwards, whilst in the space between the flap 3 and the upper wall 51 water is drawn in via the check valves 53.

Figure 11:
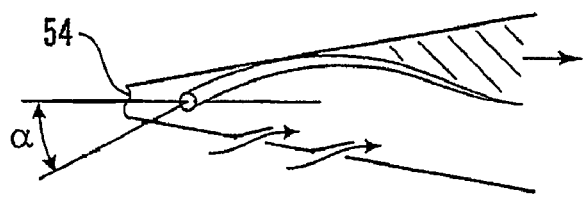
Figure 13:
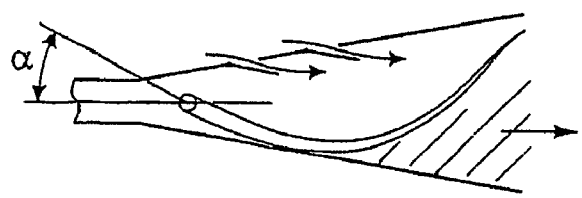

When the flap 3 is thus swung further in a clockwise direction to close to the lower wall 52, a flap form as shown in FIG. 13 is obtained, which resembles that shown in FIG. 11. The angle α represents the angle between the neutral plane and the plate plane of the flap at the forward end of the flap. This movement is optionally terminated with the flap 3 resting against the lower wall along its entire length.

The device shown in FIGS. 10-13 is thus very simple and efficient, and if in addition it comprises vertical side walls or plates, its efficiency can be increased further. At the forward portion of the flap there may be provided a torsion spring or the flexure of the flap portion 17 can be provided by the forward portion being elastically deformable so that the desired oscillation effect is obtained.

FIG. 14 shows a device whose function is similar to the function of the device shown in FIG. 5, but which is arranged in a conduit or pipeline 90 having an upper wall 91 and a lower wall 92. Through openings in the walls 91, 92 there is sealingly and slidably passed an element in the form of an arm or rod 8 which is connected to a driving rod 7 of a drive unit 6, the rod 8 being arranged to be moved back and forth in its longitudinal direction. The end of the upper portion of the rod 8 projects from the upper wall 91 and is acted on by two springs 94, 95 which try to hold the rod 8 in a neutral position, but which allow the arm to be moved resiliently away therefrom.

At a point of connection 93 at a central portion of the rod 8, the rod is connected to a forward end portion of a flap 3, the connection being elastic and allowing the flap 3 to be tilted about the point of connection 93.

FIG. 15 shows a device that comprises a flap 100 which is arranged to tilt about a tilting axis 5 that is close to a portion of a wall 102. The flap 100 comprises check valves 103 which allow water to flow into the space that is defined by the flap 100 and the wall portion 102 as is shown by arrows. A forward portion of the flap 3 is connected to a spring such as a torsion spring 9, and a drive unit 6 is arranged for exertion of a transitory force against an arm 8 that is connected to the flap 100.

For example, the wall portion may be a portion of the skin or the planking of a ship. An oscillating tilting of the flap towards and away from the wall portion 102, results in a backward movement of water and thus a movement of the ship as described above.

FIG. 16 shows an assembly comprising two flaps 100 of the type shown in FIG. 15. The flaps 100 can be moved independent of each other or dependent on each other, e.g., in opposite phase. Disposed between the flaps 3 is a plate 105 that is fixedly connected to the ship.

FIG. 17 is a side view of an embodiment of the invention, wherein the invention comprises two flaps 61, 62 which can be moved in opposite phase.

Each flap 3 has an arm 64, 65, and the arms 64, 65 are articulated to each other via a connecting rod means 66 which in turn is connected to a drive unit 6. Each of the flaps 61, 62 is connected to a helical torsion spring 69, 70.

Each flap 3 has at least one valve 67, 68 which resembles that shown in FIG. 16, these valves being arranged to allow water to flow into a space between the flaps 61, 62, but not in the opposite direction.

In this device, the flaps 61, 62 are arranged to oscillate towards each other or away from each other in opposite phase between the extreme position shown in solid lines and the extreme position shown in broken lines about respective neutral positions. When the flaps 61, 62 are not actuated by the drive unit 6 and the springs 69, 70, and are stationary, they are in their respective neutral positions or neutral plane between the illustrated positions.

During a movement of the flaps 61, 62 towards each other, water between them can be forced out backwards from the space between the flaps 61, 62, whilst the valves 67, 68 are kept closed. When the flaps 61, 62 are moved away from each other, water can flow into this space via the valves 67, 68. Thus, a highly efficient device according to the invention can be obtained.

To increase the thrust or pumping action of the aforementioned devices, a plurality thereof can be put together in an assembly.

FIG. 18 shows a device with two flaps 3 of the type shown in FIG. 6. The flaps are arranged between two outer walls 21, 22 of a conduit. A streamlined, central guide plate 20 is disposed between the flaps 3. Instead of a helical torsion spring according to FIG. 1, there is provided, as in FIG. 6, a pair of pressure springs 23, 24 which actuate respective sides of an arm 8, which is connected to a pivot axle 4 of the flap 3. The flaps 3 are connected to respective pivot arms 25, 26 which are interconnected via an articulated arm 27. A drive unit 6 is arranged to actuate the articulated arm 27 in the manner described above. Instead of the device having just two flaps, a row of flaps can be arranged side by side in the same way.

FIG. 19 shows an arrangement where a row of devices of a type similar to that shown in FIG. 7 may be arranged side by side and transverse to the direction of motion F.

FIGS. 20-22 are views of a device resembling that shown in FIG. 7, but where the device is arranged in a portion 42 of a pipeline 41 to pump a fluid through the pipeline, the portion 42 having a rectangular cross-section. The pipeline 41 thus forms an object past which the fluid flows during operation of the device.

In FIG. 20, which shows the device from above, an upper cover 45 (FIG. 21) has been removed. It is thus possible to see a flap 3 which via a pivot axle 4 is pivotally supported in opposite side walls or covers 43, 44 of the pipeline portion 42.

FIG. 21 is a side view of the pipeline 41, where a side cover 44 has been removed. Above and below the flap 3 there are provided respective plates or walls 46, 47, and in each of these plates 46, 47 a number of valves of the type shown in FIG. 7 are mounted. Furthermore, the forward portion of the plates 46, 47 are interconnected via a front plate 48. In addition, a number of check valves 50 are provided between the rear ends of the plates to prevent a flow of fluid forwards in the pipeline during portions of the oscillation of the flap 3.

FIG. 22 shows an enlarged section A in FIG. 21, where the arrangement of a check valve 49 is shown more clearly.

FIG. 23 shows a section through the pipeline 41 taken along the line X-X in FIG. 21. This line runs between flanges that connect portions of the pipeline together.

FIG. 24 shows a device having three flaps 3 of the type shown in FIG. 14, springs and a drive unit having been omitted. Through the arrangement of an arm or rod 8 which is connected flexibly to all the flaps 3, and the springs and the drive unit, a very simple device is obtained which can be used in a pipeline for pumping a fluid, or as a ship drive unit like a water jet device. Optionally, the flaps may be located in the water by the ship, the arm 8 being supported in a support that projects from the hull.

FIG. 25 shows an assembly with five devices of the type shown in FIG. 16, wherein it is shown schematically that springs, drive unit and flaps can be connected together via rods.

FIG. 26 is a schematic view showing an assembly of, e.g., 16 devices comprising flaps of the type shown in FIGS. 1-17, seen from behind. For example, the assembly comprises four rows of devices, wherein each row comprises four devices, the devices being spaced apart. The assembly may, for example, be placed in a pipeline 107 for pumping a fluid, or located in the water at the stern of a ship for the propulsion thereof. The devices may, for example, be controlled and operated individually, e.g., for manoeuvring the ship. Alternatively or additionally, they may be arranged so that they can be swung about common or individual vertical axes of oscillation.

Lastly, FIG. 27 shows an assembly resembling that shown in FIG. 24, wherein at each side in a pipeline 110 there is arranged a vertical arm 8 which runs transversely through the pipeline 110 and sealingly through an upper and a lower portion thereof. Behind each arm 8 there is provided a support 111 in which there is formed a series of recesses 112 that are spaced apart in the vertical direction. Three stay bars 113 run between the arms 8 with corresponding vertical spacing.

Three flaps 114 are also arranged in the conduit. In the forward portion of each flap there is formed a through hole that runs in the transverse direction of the flap. The holes are elongate in the longitudinal direction of the flap and a stay bar 113 runs through each hole. The rear end portion of the flaps is inserted into the respective recesses 112.

On movement of the rod 8 alternately up and down, a movement of a fluid in the pipeline can be obtained in the direction indicated by arrows.

It will be understood that many features of the described and illustrated embodiments can be combined. For instance, the flaps may be inflexible or made of an elastic material, and plates or walls may be provided that run above and/or below the flaps and/or at the sides thereof. If flaps and walls are provided, valves may be provided in the flaps, or the walls.

Although in the above it is indicated that the plate plane of the flaps may run horizontally, it will be understood that the plate plane may run vertically or obliquely.

All embodiments of the device according to the invention can be used for propulsion of vessels or for pumping a fluid in a pipeline or in another manner for obtaining a movement of the fluid and the device relative to each other.

For the sake of clarity, as simple means as possible have been used for the illustrated exemplary embodiments. For example, as a spring element that tries to hold the flap in a neutral position, a helical torsion spring or a coil spring has been used. However, a person skilled in the art will understand that any other means could be used, e.g., pneumatic means, in order to obtain the same effects.

Although in the above it has been stated that the drive unit is of the intermittent type for operation of the flaps, drive means for continuous operation may be used.

The invention claimed is:

1. A device for movement of an object in a direction of motion relative to a fluid, wherein the device comprises:
   at least one flap member having a flap portion that runs in a plate plane, and a forward portion;
   a first connecting means by which the forward portion is connected to a hull, and which allows the flap portion to be moved in the fluid transverse to the plate plane between two positions which are on respective sides of a neutral plane;
   an actuating means which together with the flap member forms a mechanical oscillatory arrangement and is arranged to allow an oscillating motion of the flap member; and
   a drive unit for intermittent actuation of the flap member for starting the movement thereof and increasing the movement when the value of an oscillation amplitude of the flap member is less than a predetermined threshold value.

2. The device according to claim 1, wherein the first connecting means comprises a hinge device which allows a tilting motion of the flap member relative to the hull.

3. The device according to claim 1, wherein the forward portion of the flap member comprises a rod.

4. The device according to claim 3, wherein the rod is connected to the flap portion by a second connecting means.

5. The device according to claim 4, wherein the second connecting means is a hinge device.

6. The device according to claim 5, wherein the second connecting means comprises a flexible portion of the flap portion.

7. The device according to claim 1, wherein the second connecting means comprises means which in an elastically resilient manner try to hold the flap portion and the forward portion in a predetermined position relative to each other.

8. The device according to claim 1, wherein the first connecting means comprises a means for movement of the forward portion transverse to the neutral plane.

9. The device according to claim 8, wherein the means for translational movement of the forward portion comprises an element that supports the forward portion, and which is supported in the object and is arranged to be moved in a path that runs transverse to the neutral plane.

10. The device according to claim 9, wherein the element comprises a slide block that is supported in a rail which runs transverse to the neutral plane.

11. The device according to claim 8, wherein the element comprises a rod, where at least one end portion of the rod is supported in the hull.

12. The device according to claim 1, wherein on at least one side of the flap member there is provided a wall that is stationary in relation to the object.

13. The device according to claim 12, wherein one of the flap member and the wall are provided with at least one check valve which opens in the direction of the space defined by the flap member and the wall.

14. The device according to claim 13, wherein there is provided one wall and one flap member, and that the space between the flap member and the wall is extended backwards, as seen in the direction of travel of the object, apart from when the plate plane of the flap runs close to the wall.

15. The device according to claim 13, wherein there is provided two walls and that the space between them is extended backwards, as seen in the direction of travel of the hull.

16. The device according to claim 1, wherein there is provided two flap members having a coincident tilting axis or respective tilting axes that run close to each other, the flap members being movable in opposite phase.

17. The device according to claim 1, wherein the flap portion of the flap member and/or the forward portion of the flap member are elastically flexible.

18. The device according claim 12, wherein successive portions of the flap portion, as seen from the front and backwards, are arranged to consecutively come to bear against the wall.

19. The device according to claim 1, wherein the flap portion, when viewed in the direction of its plate plane, is triangular, an apex of the triangle facing forwards.

20. The device according to claim 1, wherein the device is located in a conduit or pipeline and is arranged to pump the fluid therethrough.

21. An arrangement comprising a plurality of devices according to claim 1, wherein the devices are arranged in at least two rows that run at an angle to each other.

22. An arrangement according to claim 21, wherein the drive units of the devices are individually controllable.

23. A device according to claim 1, wherein the forward portion comprises a rod which runs in the direction of motion, and whose rear portion is connected to the flap portion via rigid or elastic means, which try to hold the flap portion and the rod in a predetermined position relative to each other, and the flap portion of the flap member and/or the rod are elastically flexible.

24. A device according to claim 1, wherein the flap portion when viewed looking away from its plate plane, is triangular, wherein an apex of the triangle faces forwards and is connected to a rear end portion of the rod.

25. A pump, wherein it comprises at least one device according to claim 1, wherein the device is located in a conduit of the pump.

26. A pump according to claim 25, wherein it comprises a plurality of devices according to claim 1, wherein the drive units of the devices are individually controllable.

27. A vessel, wherein as propulsion means it comprises at least one device.

28. A vessel according to claim 27, wherein it comprises a plurality of devices according to claim 1, wherein the drive units of the device are individually controllable.

* * * * *